United States Patent
Lin et al.

(10) Patent No.: US 9,898,624 B2
(45) Date of Patent: Feb. 20, 2018

(54) MULTI-CORE PROCESSOR BASED KEY PROTECTION METHOD AND SYSTEM

(71) Applicants: Data Assurance and Communication Security Research Center, Chinese Academy of Sciences, Beijing (CN); Institute of Information Engineering, Chinese Academy of Sciences, Beijing (CN)

(72) Inventors: Jingqiang Lin, Beijing (CN); Le Guan, Beijing (CN); Jing Wang, Beijing (CN); Qiongxiao Wang, Beijing (CN); Jiwu Jing, Beijing (CN); Bao Li, Beijing (CN)

(73) Assignees: Data Assurance and Communication Security Center, Chinese Academy of Sciencess, Beijing (CN); Institute of Information Engineering, Chinese Academy of Sciences, Beijing (CN)

( * ) Notice: Subject to any disclaimer, the term of this patent is extended or adjusted under 35 U.S.C. 154(b) by 5 days.

(21) Appl. No.: 14/744,803

(22) Filed: Jun. 19, 2015

(65) Prior Publication Data
US 2015/0310231 A1    Oct. 29, 2015

Related U.S. Application Data

(63) Continuation of application No. PCT/CN2014/075042, filed on Apr. 10, 2014.

(30) Foreign Application Priority Data

Nov. 14, 2013 (CN) .......................... 2013 1 0565691

(51) Int. Cl.
*G06F 21/72* (2013.01)
*H04L 9/08* (2006.01)
(Continued)

(52) U.S. Cl.
CPC ............ *G06F 21/72* (2013.01); *G06F 9/5044* (2013.01); *G06F 21/74* (2013.01); *H04L 9/0894* (2013.01); *H04L 9/30* (2013.01)

(58) Field of Classification Search
CPC ......... G06F 21/72; G06F 9/5044; H04L 9/30; H04L 9/0894
See application file for complete search history.

(56) References Cited

U.S. PATENT DOCUMENTS

| 2005/0105738 A1* | 5/2005 | Hashimoto ............. G06F 21/72 380/277 |
| 2012/0331308 A1* | 12/2012 | Fernandez Gutierrez ................ G06F 21/72 713/190 |

FOREIGN PATENT DOCUMENTS

| CN | 101170406 A | 4/2008 |
| CN | 101308536 A | 11/2008 |

(Continued)

OTHER PUBLICATIONS

International Search Report for International Application No. PCT/CN2014/075042 dated May 23, 2014, and its English translation thereof.

*Primary Examiner* — Brandon Hoffman
*Assistant Examiner* — Nega Woldemariam
(74) *Attorney, Agent, or Firm* — Harness, Dickey & Pierce, P.L.C.

(57) ABSTRACT

A multi-core processor based key protection method and system is described. An Operating System (OS) supporting Symmetric Multi-Processing (SMP) is set up on a multi-core processor. One core of the multi-core processor is configured as a cryptographic operation core, which is prohibited from running other processes of the OS and dedicated to perform a public-key cryptographic operation. The private key and an intermediate variable in a process of the public-key (Continued)

cryptographic operation are stored in a cache exclusively occupied by the cryptographic operation core.

12 Claims, 2 Drawing Sheets

(51) Int. Cl.
    *H04L 9/30*     (2006.01)
    *G06F 9/50*     (2006.01)
    *G06F 21/74*     (2013.01)

(56) References Cited

FOREIGN PATENT DOCUMENTS

| CN | 102103673 A | 6/2011 |
|---|---|---|
| CN | 103607279 A | 2/2014 |

* cited by examiner an OS supporting SMP is set up on a multi-core processor and one core of the multi-core processor is configured as a cryptographic operation core. The cryptographic operation core is prohibited from running other processes of the OS and dedicated to perform a public-key cryptographic operation

101 a public-key cryptographic algorithm is performed by the cryptographic operation core. The private key and intermediate variables used in a cryptographic process are stored in the cache exclusively occupied by the cryptographic operation core

MULTI-CORE PROCESSOR BASED KEY PROTECTION METHOD AND SYSTEM

CROSS-REFERENCE TO RELATED APPLICATIONS

This application is a continuation of International Application No. PCT/CN2014/075042, filed Apr. 10, 2014. This application claims the benefit and priority of Chinese Application No. 201310565691.5, filed Nov. 14, 2013. The entire disclosures of each of the above applications are incorporated herein by reference.

FIELD

The present disclosure relates to computer security field and to a multi-core processor based key protection method and system.

BACKGROUND

This section provides background information related to the present disclosure which is not necessarily prior art.

Present common cryptographic algorithms mainly include symmetric cryptographic algorithms and public-key cryptographic algorithms. The symmetric cryptographic algorithm performs an encryption operation and a decryption operation using a same key. Communicating parties keep their shared keys secret. The symmetric cryptographic algorithm is mainly used for performing rapid data encryption and decryption. In the public-key cryptographic algorithms, keys are generated in pairs. Each pair of keys consists of a public key and a private key. In the practical application of the public-key cryptographic algorithm, the public key is publicly known, while the private key is known only by the owner. In a public-key cryptographic algorithm method for signature systems, a message is encrypted with the private key (called "signing a message") and a digital signature is then obtained. The digital signature is decrypted with the public key to authenticate the digital signature (called "verifying a signature"). In a public-key cryptographic algorithm used for an encryption system, data is encrypted with the public key. The encrypted data is decrypted with the private key to obtain the plain-text data.

SUMMARY

This section provides a general summary of the disclosure, and is not a comprehensive disclosure of its full scope or all of its features.

According to characteristics and security factors of the public-key cryptographic algorithm in a computer system, a multi-core processor based key protection method and system is provided to ensure the security of implementing the public-key cryptographic algorithm in the computer system.

Various embodiments of the present disclosure provide a multi-core processor based key protection method, including:

setting up an Operating System (OS) supporting Symmetric Multi-Processing (SMP) on a multi-core processor;

configuring one core of the multi-core processor as a cryptographic operation core, which is prohibited from running other processes of the OS and dedicated to perform a public-key cryptographic operation;

performing the public-key cryptographic operation with the cryptographic operation core; and storing a private key and an intermediate variable used in the public-key cryptographic operation in a cache exclusively occupied by the cryptographic operation core.

Various embodiments of the present disclosure provide a multi-core processor based key protection system, including:

a first module, to set up an Operating System (OS) supporting Symmetric Multi-Processing (SMP) on a multi-core processor and configure one core of the multi-core processor as a cryptographic operation core, which is prohibited from running other processes of the OS and dedicated to perform a public-key cryptographic operation; and a second module, to perform the public-key cryptographic operation with the cryptographic operation core and store a private keys and an intermediate variable in the public-key cryptographic operation in a cache exclusively occupied by the cryptographic operation core.

With the multi-core processor based key protection method and system provided by various embodiments of the present disclosure, an OS supporting Symmetric Multi-Processing (SMP) is set up on a multi-core processor. One core of the multi-core processor is configured as a cryptographic operation core, which is prohibited from running other processes of the OS and is dedicated to perform public-key cryptographic operations. The private key and intermediate variables used in the public-key cryptographic operation are stored in the cache exclusively occupied by the cryptographic operation core. Therefore, the attacker attempting to steal the private key from the physical memory chips is defeated and the security for implementing the public-key cryptographic algorithm in the computer system is ensured.

Further areas of applicability will become apparent from the description provided herein. The description and examples in this summary are intended for purposes of illustration and are not intended to limit the scope of the present disclosure.

DRAWINGS

The drawings described herein are for illustrative purposes of various embodiments and not all possible implementations, and are not intended to limit the scope of the present disclosure.

FIG. 1 is a flow chart of a multi-core processor based key protection method according to various embodiments;

Corresponding reference numerals indicate corresponding parts throughout the several views of the drawings.

DETAILED DESCRIPTION

Figure 2:
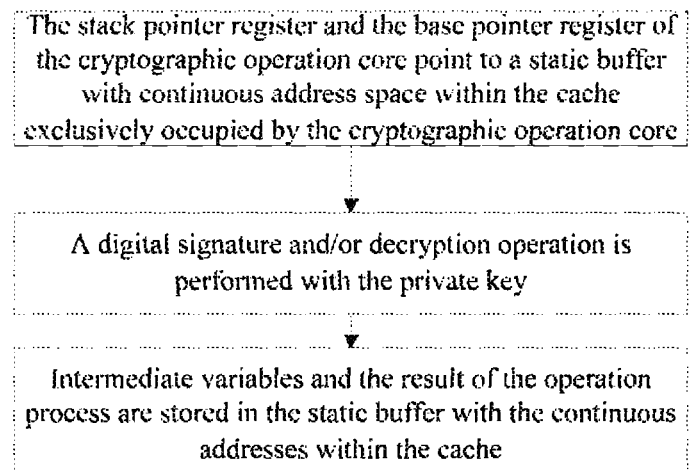
FIG. 2 is a flow chart illustrating a method for storing intermediate variables into the cache according to various embodiments.

Various embodiments will now be described more fully with reference to the accompanying drawings.

The present disclosure is further described in detail hereinafter with reference to the accompanying drawings to make the method more apparent.

With the development of Internet technologies, commerce activities and cyber transactions are a standard part of one's daily life. In order to ensure security features, such as authenticity, confidentiality, integrity, and accountability, cryptographic techniques based on digital certificates are widely used in networked information systems. A digital certificate is generated on top of public-key cryptographic algorithms. The public key and the identity of its owner are bound together in a digital certificate, so that the identification of a network user is provided by its public key or digital certificate. This technology is used in electronic authentication that secures network communications.

A precondition for implementing secure communication is ensuring confidentiality of the private key of the corresponding digital certificate. The storage of the private key shall prevent unauthorized access, so that an attacker stealing the private key and forging a digital signature is defeated. There are various types of storage mediums for the private key, such as a floppy disk, a smart card, a USB key token, and other computer hardware. If the private key is stored in a floppy disk or a storage card, these two kinds of medium connect with the computer when the private key is being used. However, since the floppy disk and the storage card do not have computing ability, when the cryptographic computation is performed, the private key is copied from the storage medium and stored in the computer temporarily. The security is not essentially improved compared with a method that stores the private key directly in a computer hard-disk. The storage of the private key with the USB key token and smart card may ensure higher security. If the private key does not need to be read from the storage medium during its use, the attacker cannot compromise the private key. However, the current method for storing the private key in an external medium is inconvenient for the user, as the user must always carry the storage medium.

In order to address the inconvenience of using the external medium for storing the private key, current methods store the private key in the computer hard disk. The user directly generates a public-private key pair in the computer, and the private key may then be stored in the computer hard disk protected by a password. When the private key needs to be used, the private key is decrypted with the password and written into the computer memory and cryptographic operations are executed. However, storing the private key in the physical memory of the computer has potential security risks. Physical memory is typically implemented as Dynamic Random Access Memory (DRAM) chips. The attacker may steal the private data via intrusions (unauthorized memory read) and cold boot attack. The unauthorized memory read may exploit a bug in system call of the Operating System (OS). The attacker may read arbitrary memory locations to obtain information of the private key. On the other hand, cold boot attacks exploit the remanence effect of DRAM chips. That is, storage content of DRAM chip is gradually lost after power down, and the whole process lasts for much longer than expected (several seconds). If a refrigerant is used to cool down the chip, the process may last for even longer (several hours). The attacker may directly power off the computer when the computer is running or hanging up, then remove the DRAM chip, and plug it into a computer which boots from a malicious USB booting disk. The computer can directly copy the content stored in the target DRAM to obtain information in the memory. In order to eliminate these potential risks, under the premise of convenience for the user, how to securely implement a cryptographic algorithm in a computer is an important issue.

In order to address the above challenges, in the current method, a symmetric key for encrypting the data on disk is stored in the registers of a processor. However, since the capacity of registers is relatively small, only short symmetric keys may be stored in the registers, which is not suitable for the public-key cryptographic algorithm. On this basis, with the development of CPU technologies, registers supporting Advanced Vector Extensions (AVX), such as YMM registers are widely deployed. These registers may provide larger storage space to support a Rivest-Shamir-Adleman (RSA) public-key algorithm with keys of up to 2048 bits. However, this scheme also has disadvantages. First, the scheme has poor scalability. Only the basic cryptographic operations may be implemented and it is difficult for the scheme to support more security features, such as anti-side-channel attack (e.g., RSA blinding) or acceleration (e.g., Chinese Remainder Theorem). Second, if longer keys are to be supported, more space in registers is necessary. This can only be accomplished by CPU manufacturers. Third, the scheme greatly depends on a hardware platform. Since the registers are directly operated, high-level programing languages, such as the C programing language, cannot be supported. Fourth, AVX or Streaming Single Instruction Multiple Data (SIMD) Extensions (SSE) functions need to be disabled, which greatly affects performances of the CPU in processing a data-intensive application and graphic processing applications since the these applications utilize these registers for acceleration.

In another method, the key is stored in a kernel mode and the user cannot directly operate on the key. However, this method cannot resist selected attacks, such as a cold boot attack, that operate on a physical memory chip.

Given that the key of the public-key cryptographic algorithm is relatively long, for instance, as for the RSA algorithm, the key length of a Certification Authority (CA) needs more than 2048 bits. In order to ensure the security of a public-key cryptographic algorithm, enough storage capacity is needed to store the private key. Presently, the multi-core process has been widely used. Each core of the CPU can own an exclusive cache and several cores share some caches. In the memory hierarchy of a computer system, the cache is a small-capacity storage at a high speed between the CPU and the physical memory chips. The cores of the CPU and the caches, which are exclusively occupied by the cores of the CPU, can constitute a relatively independent environment. The storage capacity of the cache is much larger than that of the register of the CPU and is enough to store the keys of a public-key cryptographic algorithm to support algorithms of security enhancement and computation acceleration.

The present disclosure can be implemented based on the following considerations.

The multi-core processor has been widely used. Each core can own an exclusive cache and several cores share some caches. In the memory hierarchy of a computer system, the cache is has small-capacity storage at a high speed between the CPU and the physical memory chips. A core of the CPU and the caches, which are exclusively occupied by the core of the CPU, constitute a relatively independent environment. The storage capacity of the cache is much larger than that of the register of the CPU, and is enough to store the keys of the public-key cryptographic algorithm to support various algorithms of security enhancement and acceleration.

In the typical structure of a multi-core processor, each core has a set of registers, including general purpose registers, such as EAX, EBX, ECX, and EDX, segment registers, such as Code Segment (CS) and Data Segment (DS), a flag register, a control register, a Model Specific Register (MSR) and extension instruction set registers, such as XMM and YMM. Larger amounts of registers cannot be set in one core due to limitation of resources. Further, many of these registers are set for special purposes and cannot be used to implement a general purpose computing process (such as ESP and EBP are generally used to trace a stack frame of a procedure). Access to a register is performed via the name of the register. The execution context of one core does not affect the other and a message is transmitted via a shared bus.

Each core has an exclusive on-chip cache. A cache line maps a corresponding physical memory, which is accessed recently by the core, taking part of a physical address as an index. Therefore, its usage in the program is less limited because all data in the physical memory may be stored in the cache. If the cache access mode is configured approximately, a user-mode application may transparently utilize the cache. If the write-back access mode is configured for the core, each memory access (including read and write) occurs in the cache (if the cache does not store the data of the address, the data needs to be read into the cache first). However, if an un-cacheable access mode is configured for the core, a memory access will not occur in the cache and the physical memory chips will be directly accessed. Compared with register resources, a typical CPU possesses a large number of caches. Each core exclusively occupies a level-1 cache of 32 KB and a level-2 cache of 256 KB and all cores share a level-3 cache of several MB.

Cold boot attacks mentioned in the present disclosure aim at a physical memory chip. However, the on-chip cache is generally integrated into the CPU. Therefore, sensitive data, such as a plaintext private key in the cache cannot be obtained via the cold boot attack.

Based on the above, protecting plaintext private keys is not enough to ensure the security of information of a private key. A computation process with the private key also needs some intermediate variables and an attacker may be able to obtain the sensitive data from these intermediate variables. Therefore, it shall be ensured that these intermediate variables are also only stored in the cache.

Based on the above considerations, various embodiments of the present disclosure provide a multi-core processor based key protection method. The method includes the following blocks.

Block 101: An OS supporting SMP is set up on a multi-core processor and one core of the multi-core processor is configured as a cryptographic operation core. The cryptographic operation core is prohibited from running other processes of the OS and dedicated to perform a public-key cryptographic operation.

Block 102: A public-key cryptographic algorithm is performed by the cryptographic operation core. The private key and intermediate variables used in a cryptographic process are stored in the cache exclusively occupied by the cryptographic operation core.

The key protection method provided by the present disclosure is described in detail accompanying the various embodiments.

As shown in FIG. 1, the OS running on the multi-core processor is set and one core of the multi-core processor is set as the cryptographic operation core. The cryptographic operation core is prohibited from running other processes of the OS and dedicated to perform the public-key cryptographic operations. In order to isolate a process of the public-key cryptographic operation, some schemes provided by the OS shall be used. The schemes include, first, changing the CPU affinity of the process of the public-key cryptographic operation, so that public-key cryptographic operation runs solely on the designated cryptographic operation core and other system/application processes cannot run on the designated cryptographic operation core. Second, configuring a scheduling domain of the OS to take the designated cryptographic operation core as a domain independent of the OS. That is, all task processes of the OS, except for an explicitly-scheduled task process (for instance, sched_setaffinity system call is used in Linux or a set_cpus_allowed_prt function is used in a kernel) cannot be executed on the domain. Each time the public-key cryptographic operation starts, the public-key cryptographic operation process is explicitly scheduled to this domain. Using the above methods, the cryptographic operation core is prohibited from running other processes of the OS and is dedicated to perform the public-key cryptographic operation.

The private key of the public-key cryptographic algorithm may be stored in the hard disk protected by a password.

The cryptographic operation core reads input data, loads the cryptographic computation routine, provides an interface for the user to input a password, and reads the private key protected with the password from the hard disk. The cryptographic operation core decrypts the private key protected with the password input by the user and stores a plaintext of the private key in the cache of the cryptographic operation core for cryptographic computation.

The common public-key cryptographic operation includes a public-key operation and a private-key operation. The private-key operation may include a digital signature and/or decryption operation. As for the RSA public-key cryptographic algorithm, when the private-key operation is performed, in order to speed up the computation, the private keys include auxiliary data, such as p, q, d (mod p), d (mod q) and q−1 (mod p) in addition to the basic private keys that consist of N and d. The above data may be used in acceleration algorithms such as Chinese Remainder Theorem. Therefore, the above auxiliary data is partial of the private keys and shall be stored in the cache also.

When the public-key cryptographic operation is performed, various intermediate variables are used in the operation process. These intermediate variables generally include partial information of the private keys. In order to further ensure the security for implementing the public-key cryptographic operation in the computer system, these intermediate variables being obtained by the attacker is avoided. With these intermediate variables, the private key may be deduced.

According to various embodiments, in order to avoid the above issue, the intermediate variables generated in the cryptographic operation process are stored in the cache exclusively occupied by the cryptographic operation core.

Generally, the OS may allocate address space for the intermediate variables via two methods, i.e. stack and heap. The stack adopts a static address space allocation method. When a program calls a function, data such as an automatic variable, function parameter, and return value of the function is stored in the stack space designated by the OS. The heap adopts a dynamic address space allocation method and allocates the address space for usage when the program needs it. The allocated address space may be discontinuous and uncertain. If it cannot be ensured that the intermediate variables stored with the above two methods cannot be leaked into the memory, the attacker may obtain the sensitive information via the intermediate variables.

In order to centrally manage the address space mapped by the cache, the discontinuous and uncertain heap allocation method shall be avoided. Furthermore, although the address space allocated by the stack is continuous, the program cannot control an allocation location of the stack. Therefore, it cannot be ensured that all the address space is stored in the cache. Therefore, the technical method of the present disclosure adopts the static address space allocation method as follows.

As shown in FIG. 2, before the digital signature and/or decryption operation is performed with the private key, a stack pointer register (e.g., ESP) and a base pointer register (e.g., EBP) of the cryptographic operation core point to a static buffer with continuous address space of the cache exclusively occupied by the cryptographic operation core. The intermediate variables and result of the operation process are then stored in the static buffer (i.e., continuous addresses within the cache).

Since the process switch may swap data in general purpose registers into the memory in the form of a Process Control Block (PCB) during the cryptographic operation, and if other processes simultaneously use a large amount of memory, data in the cache may be synchronized to the RAM chip. To avoid this situation, according to various embodiments of the present disclosure, before the stack pointer register (ESP) and base pointer register (EBP) of the cryptographic operation core point to the static buffer with continuous addresses within the cache exclusively occupied by the cryptographic operation core, the maskable interrupt of the cryptographic operation core is disabled, so the OS is prohibited from occupying the cryptographic operation core and the whole computation process is kept atomic. After the atomic operation started, all cores flush their caches into the RAM chips via WBINVD instruction, and then let other cores enter into the no-fill mode by setting register CR0. In the no-fill mode, it is prohibited that the address in caches, except for the cache exclusively occupied by the cryptographic operation core, is replaced.

After the computation is finished and the result in the cache is synchronized to the RAM chips (e.g., a CLFLUSH instruction is executed), in order to ensure that all sensitive data is not synchronized to the RAM chips, a data cleanup operation needs to be performed for the cache exclusively occupied by the cryptographic operation core and can be implemented by executing INVD instruction. Further, general purpose registers may store the intermediate variables, so they need to be cleared up. After the data cleanup operation is performed for the cache exclusively occupied by the cryptographic operation core is finished, a function for all cores except for the cryptographic operation core is called to restore the normal cache access mode.

Figure 3:
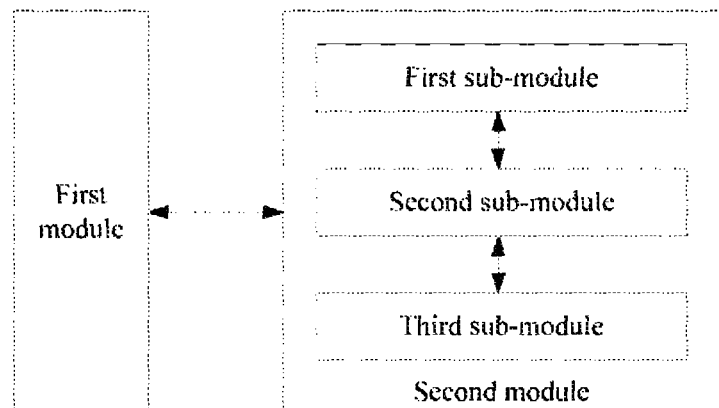
FIG. 3 is a diagram illustrating structure of a multi-core processor based key protection system according to various embodiments.

Various embodiments of the present disclosure further provide a multi-core processor based key protection system corresponding to the above method. As shown in FIG. 3, the system includes the following.

a first module, configured to set an OS supporting SMP on a multi-core processor, configures one core of the multi-core processor as a cryptographic operation core, which is prohibited from running other processes of the OS and dedicated to perform public-key cryptographic operations; and a second module, configured to perform the public-key cryptographic operations with the cryptographic operation core and store the private key and intermediate variables of a process of the public-key cryptographic operation in a cache exclusively occupied by the cryptographic operation core.

The second module may include the following.

a first sub-module, configured to store the private key of a public-key cryptographic algorithm in a hard disk protected by a password;

a second sub-module, configured to control the cryptographic operation core to read input data, load a cryptographic routine, provide an interface for a user configured to input a password, and read the private key stored in the hard disk protected by the password; and a third sub-module, configured to control the cryptographic operation core to decrypt the private key stored in the hard disk protected by the password input by the user and store a plaintext of the private key in the cache exclusively occupied by the cryptographic operation core for computation.

The third sub-module is further configured to perform a digital signature and/or decryption operation with the private key, store the intermediate variables and a result generated in the process of the public-key cryptographic operation in the cache exclusively occupied by the cryptographic operation core, synchronize the result to the computer memory chips, and perform a data cleanup operation for the cache exclusively occupied by the cryptographic operation core.

The third sub-module is further configured to point a stack pointer register (ESP) and an base pointer register (EBP) of the cryptographic operation core to a static buffer with continuous addresses within the cache exclusively occupied by the cryptographic operation core before the digital signature and/or decryption operation is performed with the private key and store the intermediate variables and result generated in the process of the public-key cryptographic operation in the static buffer with continuous addresses within the cache.

The third sub-module is further configured to disable the maskable interrupts of the cryptographic operation core, prohibit the OS from occupying the cryptographic operation core, place the static buffer with continuous addresses into the cache exclusively occupied by the cryptographic operation core, and prohibit replacing content in caches except for the cache exclusively occupied by the cryptographic operation core before the stack pointer register (e.g., ESP) and base pointer register (e.g., EBP) of the cryptographic operation core point to the static buffer with the continuous addresses within the cache exclusively occupied by the cryptographic operation core.

The third sub-module is further configured to synchronize the result to the computer memory chips, clear the general purpose registers when the data cleanup operation is performed for the cache exclusively occupied by the cryptographic operation core, and restore a function for all cores except for the cryptographic operation core to a state that normally access the cache.

It should be noted that for each above blocks of the multi-core processor based key protection method, one with ordinary skill in the art may implement the function of each module and sub-modules thereof in the multi-core processor based key protection system provided by the various embodiments of the present disclosure based on commodity hardware via computer software, which is not repeated here.

In view of the above, with the multi-core processor based key protection method and system provided by various embodiments of the present disclosure, an Operating System (OS) supporting Symmetric Multi-Processing (SMP) is set up on a multi-core processor. One core of the multi-core processor is configured as a cryptographic operation core, which is prohibited from running other processes of the OS and dedicated to perform a public-key cryptographic operation. The private key and intermediate variables in the process of the public-key cryptographic operation are stored in a cache exclusively occupied by the cryptographic operation core. Therefore, the attacker stealing the information of the private key from the physical memory chips is avoided, and the security for implementing the public-key cryptographic algorithm in the computer system is ensured.

What has been described and illustrated herein are examples of the disclosure along with some variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not shown or described in detail. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A multi-core processor based key protection method, comprising:
   setting up an Operating System (OS) supporting Symmetric Multi-Processing (SMP) on a multi-core processor, which comprises multiple cores;
   configuring one of the multiple cores of the multi-core processor as a cryptographic operation core, wherein the cryptographic operation core exclusively occupies a cache and is prohibited from running other processes of the OS and dedicated to perform a public-key cryptographic operation;
   performing the public-key cryptographic operation with the cryptographic operation core; and
   storing a private key and an intermediate variable generated in a process of the public-key cryptographic operation in a cache exclusively occupied by the cryptographic operation core; wherein the private key is able to be obtained from the intermediate variable;
   wherein storing the private key in the cache exclusively occupied by the cryptographic operation core includes:
   storing the private key of a public-key cryptographic algorithm in a hard disk;
   reading, by the cryptographic operation core, the private key stored in the hard disk; and
   storing the private key read from the hard disk in the cache exclusively occupied by the cryptographic operation core.

2. The method according to claim 1, wherein the private key stored in the hard disk is protected by a password; the method further comprises:
   providing an interface for a user to input the password; and
   decrypting, by the cryptographic operation core, the private key stored in the hard disk and protected by the password, which is input by the user, to obtain a plaintext of the private key;
   wherein storing the private key in the cache exclusively occupied by the cryptographic operation core comprises: storing the plaintext of the private key in the cache exclusively occupied by the cryptographic operation core.

3. The method according to claim 2, wherein the public-key cryptographic algorithm comprises: a public-key operation and a private-key operation, the private-key operation comprises: a digital signature and/or decryption operation; the method further comprises:
   performing the digital signature and/or decryption operation with the private key and storing the intermediate variable and a result generated by the process of the public-key cryptographic operation in the cache exclusively occupied by the cryptographic operation core; and
   synchronizing the result to a computer memory chip and performing a data cleanup operation for the cache exclusively occupied by the cryptographic operation core.

4. The method according to claim 3, wherein storing the intermediate variable generated by the public-key cryptographic operation in the cache exclusively occupied by the cryptographic operation core comprises:
   pointing a stack pointer register and a base pointer register of the cryptographic operation core to a static buffer with continuous addresses within the cache exclusively occupied by the cryptographic operation core before the digital signature and/or decryption operation is performed with the private key; and
   storing the intermediate variable and the result generated by the process of the public-key cryptographic operation in the static buffer with the continuous addresses within the cache.

5. The method according to claim 4, wherein before the stack pointer register and base pointer register of the cryptographic operation core point to the static buffer with the continuous addresses within the cache exclusively occupied by the cryptographic operation core, the method further comprises:
   disabling a maskable interrupt of the cryptographic operation core and prohibiting the OS from occupying the cryptographic operation core;
   placing the static buffer with the continuous addresses into the cache exclusively occupied by the cryptographic operation core; and
   prohibiting replacing contents in caches except for the cache exclusively occupied by the cryptographic operation core.

6. The method according to claim 5, wherein when the result is synchronized to the computer memory chip and the data cleanup operation is performed for the cache exclusively occupied by the cryptographic operation core, the method further comprises:
   clearing a general purpose register; and
   restoring all cores except for the cryptographic operation core to a normal cache access mode after the data cleanup operation is performed for the cache exclusively occupied by the cryptographic operation core.

7. A multi-core processor based key protection system, comprising:
   a first module configured, to set up an Operating System (OS) supporting Symmetric Multi-Processing (SMP) on a multi-core processor, which comprises multiple cores, configure one of multiple cores of the multi-core processor as a cryptographic operation core, the one core exclusively occupies a cache and is configured to be prohibited from running other processes of the OS and dedicated to perform a public-key cryptographic operation; and a second module configured, to perform the public-key cryptographic operation with the cryptographic operation core and store a private key and an intermediate variable generated in a process of the public-key cryptographic operation in a cache exclusively occupied by the cryptographic operation core, wherein the private key is able to be obtained from the intermediate variable;

wherein the second module comprises:

a first sub-module configured, to store the private key of a public-key cryptographic algorithm in a hard disk, a second sub-module configured, to control the cryptographic operation core to read the private key stored in the hard disk; and a third sub-module configured, to control the cryptographic operation core to store the private key read from the hard disk in the cache exclusively occupied by the cryptographic operation core.

8. The system according to claim 7, wherein the private key stored in the hard disk is protected by a password, the second sub-module is further configured, to control the cryptographic operation core to provide an interface for a user to input the password; and a the third sub-module is further configured, to control the cryptographic operation core to decrypt the private key stored in the hard disk and protected by the password, which is input by the user, to obtain a plaintext of the private key and store the plaintext of the private key in the cache exclusively occupied by the cryptographic operation core.

9. The system according to claim 8, wherein the third sub-module is further configured to perform a digital signature and/or decryption operation with the private key and store the intermediate variable and a result generated by the process of the public-key cryptographic operation in the cache exclusively occupied by the cryptographic operation core and synchronize the result to a computer memory chip and perform a data cleanup operation for the cache exclusively occupied by the cryptographic operation core.

10. The system according to claim 9, wherein the third sub-module is further configured to point a stack pointer register and a base pointer register of the cryptographic operation core to a static buffer with continuous addresses within the cache exclusively occupied by the cryptographic operation core before the digital signature and/or decryption operation is performed with the private key and store the intermediate variable and the result generated by the process of the public-key cryptographic operation in the static buffer with the continuous addresses within the cache.

11. The system according to claim 10, wherein the third sub-module is further configured to disable a maskable interrupt of the cryptographic operation core, prohibit the OS from occupying the cryptographic operation core, place the static buffer with the continuous addresses into the cache exclusively occupied by the cryptographic operation core and prohibit replacing contents in caches except for the cache exclusively occupied by the cryptographic operation core before the stack pointer register and base pointer register of the cryptographic operation core point to the static buffer with the continuous addresses within the cache exclusively occupied by the cryptographic operation core.

12. The system according to claim 11, wherein the third sub-module is further configured to synchronize the result to the computer memory chip, clear a general purpose register when the data cleanup operation is performed for the cache exclusively occupied by the cryptographic operation core and restore all cores except for the cryptographic operation core to a normal cache access mode.

* * * * *